United States Patent
Backstrom et al.

(10) Patent No.: US 10,969,749 B2
(45) Date of Patent: Apr. 6, 2021

(54) APPLICATION OF MODEL PREDICTIVE CONTROL (MPC)-BASED FORCED RAMPING OF PROCESS INPUT VARIABLES AND PROCESS OUTPUT REFERENCE TRAJECTORY DESIGN OVER A PREDICTION HORIZON FOR MPC-BASED PAPER MACHINE GRADE CHANGE CONTROL

(71) Applicant: Honeywell Limited, Mississauga (CA)

(72) Inventors: Johan Backstrom, North Vancouver (CA); Joyce Choi, Vancouver (CA); Pezhman Nafissi, North Vancouver (CA); Michael Forbes, North Vancouver (CA)

(73) Assignee: Honeywell Limited, Mississauga (CA)

( * ) Notice: Subject to any disclaimer, the term of this patent is extended or adjusted under 35 U.S.C. 154(b) by 377 days.

(21) Appl. No.: 15/683,693

(22) Filed: Aug. 22, 2017

(65) Prior Publication Data

US 2019/0064754 A1   Feb. 28, 2019

(51) Int. Cl.
*G06F 17/10* (2006.01)
*G05B 13/04* (2006.01)
*G05B 17/02* (2006.01)
*D21F 11/00* (2006.01)
*D21G 9/00* (2006.01)

(52) U.S. Cl.
CPC .............. *G05B 13/04* (2013.01); *D21F 11/00* (2013.01); *D21G 9/00* (2013.01); *D21G 9/0009* (2013.01); *G05B 13/048* (2013.01); *G05B 17/02* (2013.01); *G06F 17/10* (2013.01); *D21G 9/0027* (2013.01)

(58) Field of Classification Search
None
See application file for complete search history.

(56) References Cited

U.S. PATENT DOCUMENTS

| | | | |
|---|---|---|---|
| 4,224,513 A * | 9/1980 | Casey | D21G 9/0027 250/216 |
| 5,347,446 A * | 9/1994 | Iino | G05B 13/048 700/29 |
| 6,076,022 A | 6/2000 | Hagart-Alexander et al. | |

(Continued)

*Primary Examiner* — Kibrom K Gebresilassie
(74) *Attorney, Agent, or Firm* — Charles H. Jew

(57) ABSTRACT

A controller reference trajectory design technique to enable high-performing automatic grade change performed by a model predictive control (MPC). Techniques include: (1) automatic determination of appropriate process output reference trajectory delays to enable optimum coordination of process input movements; (2) providing the entire planning process output reference trajectory ramp at the start of the grade change instead of just incrementally as the grade change progresses, again enabling movement of the process inputs to drive process outputs along the planned future path instead of just towards the current target; and (3) use of the process input forced ramping to allow linear ramping of process inputs with optimal coordination of other process input movements to keep all process outputs following the desired trajectories. The technical benefits are faster and higher performing grade changes. In addition, the use of this technology allows easier setup and maintenance of the automatic grade change package.

18 Claims, 3 Drawing Sheets

(56) References Cited

U.S. PATENT DOCUMENTS

| | | | | |
|---|---|---|---|---|
| 7,330,767 B2* | 2/2008 | Thiele | ............... | G10L 1/32 700/29 |
| 7,418,372 B2* | 8/2008 | Nishira | ............... | B60K 31/047 700/44 |
| 7,846,299 B2 | 12/2010 | Backstrom et al. | | |
| 8,504,175 B2 | 8/2013 | Pekar et al. | | |
| 8,600,525 B1* | 12/2013 | Mustafa | ............... | G06N 5/003 700/33 |
| 9,557,724 B2 | 1/2017 | Chu et al. | | |
| 2003/0149493 A1* | 8/2003 | Blevins | ............... | G05B 13/048 700/18 |
| 2005/0016704 A1* | 1/2005 | Huhtelin | ............... | D21F 1/66 162/198 |
| 2006/0162887 A1* | 7/2006 | Weinstein | ............... | D21F 7/003 162/198 |
| 2007/0250215 A1* | 10/2007 | Jia | ............... | G05B 13/048 700/274 |
| 2008/0103748 A1* | 5/2008 | Axelrud | ............... | G05B 13/048 703/12 |
| 2008/0109100 A1* | 5/2008 | Macharia | ............... | C10L 1/02 700/110 |
| 2008/0264591 A1* | 10/2008 | Backstrom | ............... | D21G 9/0027 162/202 |
| 2009/0198350 A1* | 8/2009 | Thiele | ............... | G05B 17/02 700/30 |
| 2009/0204246 A1* | 8/2009 | Boder | ............... | G05B 13/048 700/103 |
| 2010/0204808 A1* | 8/2010 | Thiele | ............... | G05B 17/02 700/30 |
| 2010/0296139 A1* | 11/2010 | Nishida | ............... | G03G 15/5054 358/504 |
| 2011/0060424 A1* | 3/2011 | Havlena | ............... | G05B 13/048 700/29 |
| 2011/0096353 A1* | 4/2011 | Li | ............... | G03G 15/2064 358/1.15 |
| 2011/0218782 A1 | 9/2011 | Fisher-Rosemount | | |
| 2011/0295390 A1* | 12/2011 | Chu | ............... | D21F 7/06 700/30 |
| 2011/0301723 A1* | 12/2011 | Pekar | ............... | G05B 13/048 700/29 |
| 2012/0004756 A1* | 1/2012 | Fries | ............... | D21F 5/00 700/104 |
| 2014/0025210 A1* | 1/2014 | Joshi | ............... | G05B 13/042 700/282 |
| 2014/0110871 A1* | 4/2014 | Backstrom | ............... | D21G 9/0027 264/40.1 |
| 2014/0358254 A1* | 12/2014 | Chu | ............... | G05B 11/42 700/29 |
| 2015/0268645 A1* | 9/2015 | Shi | ............... | G05B 13/042 700/31 |
| 2016/0041536 A1* | 2/2016 | Benosman | ............... | G05B 13/048 700/31 |
| 2016/0048119 A1* | 2/2016 | Wojsznis | ............... | G05B 13/048 700/11 |
| 2016/0378073 A1* | 12/2016 | Forbes | ............... | G05B 13/021 700/52 |

\* cited by examiner

APPLICATION OF MODEL PREDICTIVE CONTROL (MPC)-BASED FORCED RAMPING OF PROCESS INPUT VARIABLES AND PROCESS OUTPUT REFERENCE TRAJECTORY DESIGN OVER A PREDICTION HORIZON FOR MPC-BASED PAPER MACHINE GRADE CHANGE CONTROL

FIELD OF THE INVENTION

The present invention generally relates to techniques for model predictive control-based implementation of grade changes in papermaking.

BACKGROUND OF THE INVENTION

In the papermaking process, it is desired that production transition from one paper grade to another take place rapidly and with a minimum of off-specification production. These events, known as grade changes may be automatically controlled by a specialized software package. These packages allow a combination of process input variables ramped in open-loop, ramping of process output (quality) variable setpoints, and other features to coordinate process input movements to achieve the desired quality variable ramping rapidly and without significant deviations from specification. Despite years of effort, numerous approaches, and a number of tools available for the task, control configuration and operation to optimally coordinate process input movements is challenging.

SUMMARY OF THE INVENTION

When changing grades, or transitioning a process from one operating point to another, it is desirable to move some process outputs or controlled variables (CVs) to new values along a smooth trajectory such as a ramp or a sigmoid-shaped curve. The movements of process inputs or manipulated variables (MVs) needed to cause the CVs to follow the desired trajectories should also be smooth and well-coordinated in order to move the CVs as expected but without unnecessary or overly-aggressive actuator movement. Additionally it is often the case that, in a grade change, some CVs need to be moved to new values but other CVs need to be kept at a constant value. In this case, the movements of the MVs need to be well-coordinated to move some CVs along their desired trajectories while keeping the other CVs at their constant targets without causing significant deviations for trajectories or targets. Also, in some cases, it is preferable to have certain MVs move a predetermined amount according to a predetermined trajectory. In this case, the movements of the other MVs must be well-coordinated with the MVs which have predetermined trajectories, so that all CVs keep to their trajectories or targets without significant deviation.

MPC is a control technology which can be used to find the optimal MV movements to direct the movements of CVs to follow planned trajectories. MPC uses process models to predict the future movements of CVs based on past MV moves and planned MV moves. For this reason, MPC is an excellent technology to apply to grade change. In particular, MPC can automatically determine the set of MV movements needed to cause CVs to follow trajectories with the least amount of deviation. MPC can also take into account the effect of predetermined MV movements on the future movement of CVs.

One important aspect of successfully using MPC for grade changes is to account for process time delays in the design of the CV trajectories and predetermined MV trajectories so that it is physically possible to coordinate MV movements to keep CVs following their trajectories without deviation.

The present invention is based in part on the development of a controller reference trajectory design technique to enable high-performing automatic grade change performed by a model predictive control (MPC). The unique aspects of the invention include: (1) automatic determination of appropriate process output reference trajectory delays to enable optimum coordination of process input movements; (2) providing the entire planning process output reference trajectory ramp at the start of the grade change instead of just incrementally as the grade change progresses, again enabling movement of the process inputs to drive process outputs along the planned future path instead of just towards the current target; and (3) use of the process input forced ramping to allow linear ramping of process inputs with optimal coordination of other process input movements to keep all process outputs following the desired trajectories. The technical benefits of the present invention are faster and higher performing grade changes. In addition, the use of this technology allows easier setup and maintenance of the automatic grade change package.

In one aspect, the invention is directed to a controller for a sheet making machine that includes: (a) a processing unit; (b) an input for providing one or more controlled variables (CVs) to the processing unit from the sheet making machine; (c) an output for providing one or more manipulated variables (MVs) from the processing unit to the sheet making machine, wherein one or more of the MVs has a pre-specified trajectory; wherein the processing unit is configured to (i) sample one or more of the CVs and to calculate MV movements to minimize a cost function that penalizes deviations of the CVs from their designed trajectories and also penalizes MV movements using a model predictive control (MPC) over a time horizon, wherein the MPC uses a quadratic programming (QP) algorithm and for each CV, a primary MV is assigned and a ramp rate is selected for the CV wherein the trajectory for the CV is generated using a primary MV-CV model and the ramp rate and (ii) implement a move of the one or more MVs and outputting one or more of the MVs to the sheet making machine.

In another aspect, the invention is directed to a method of model predictive control of a sheet making system that includes: (a) assigning a target for one or more manipulated variables (MVs); (b) selecting delays and ramps for the one or more MVs for which targets have been assigned; (c) assigning a target for one or more controlled variables (CVs); (d) selecting delays and ramps rates for the one or more CVs; (e) calculating trajectories for the one or more MVs for which targets have been assigned based on the target and the selected delays and ramps; (f) calculating trajectories for at least one controlled variable based on the target and on the selected delays and ramps; (g) calculating moves for any MVs that do not have pre-assigned targets by minimizing a cost function that penalizes deviations of the CVs from the calculated trajectories and also penalizes MV movements; and (h) implementing a grade-change using the trajectories and the calculated MV moves minimizing the cost function so as to transition from the production of the product having a first grade to production of a product having a second grade, wherein the grade-change is characterized by a time delay and forced ramp.

In a further aspect, the invention is directed to a system of controlling the production of a sheet of material, which is moving in the machine direction (MD), which system includes:

a plurality of actuators that is positioned along the MD wherein each of the plurality of actuators is controllable to vary a property of the material;

means for measuring and acquiring property data of the sheet of material; and a model predictive controller (MPC) for initiating and monitoring a transition from the production of a first grade of sheet of material to a second grade of sheet of material within a preselected time period, wherein the MPC, in response to signals that are indicative of the properties of the material, provide signals to the plurality of actuators to vary properties of the material, wherein the transition is characterized by time delays and forced ramps.

DETAILED DESCRIPTION OF PREFERRED EMBODIMENTS

Figure 1:
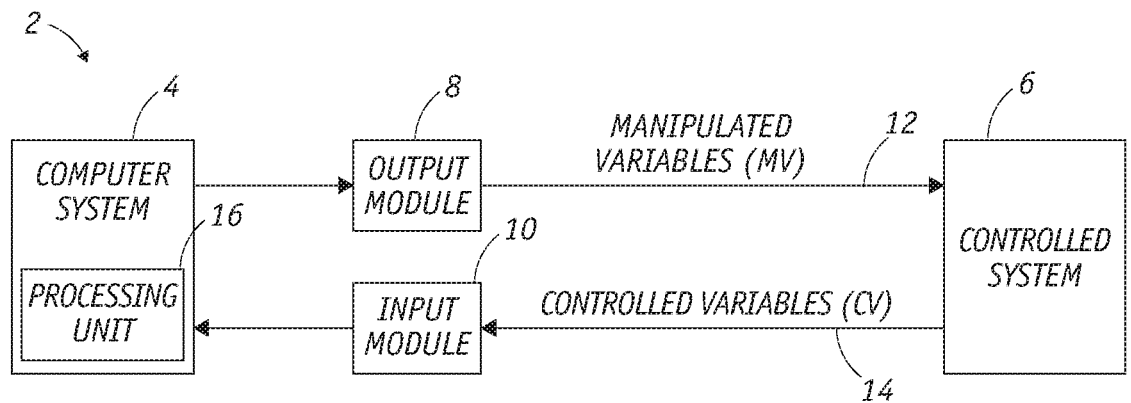
FIG. 1 is a control system incorporating an MPC controller.

FIG. 1 shows a controlled system 6 under the control of a controller 2 that includes a computer system 4, an output module 8, and an input module 10. In operation, controller 2 generates a sequence of manipulated variables (MVs) 12 from output module 8 and receives a sequence of controlled variables (CVs) (input variables) 14 from input module 10. Control outputs and inputs 12 and 14 may take the form of analog or digital control signals sent to and received from controlled system 6. The computer system 4 can include a processing unit 16 and memory (not shown). An application of the MPC system of FIG. 1 is for a papermaking machine wherein controller 2 is interfaced with a papermaking machine or components thereof during a paper grade change.

Figure 2B:
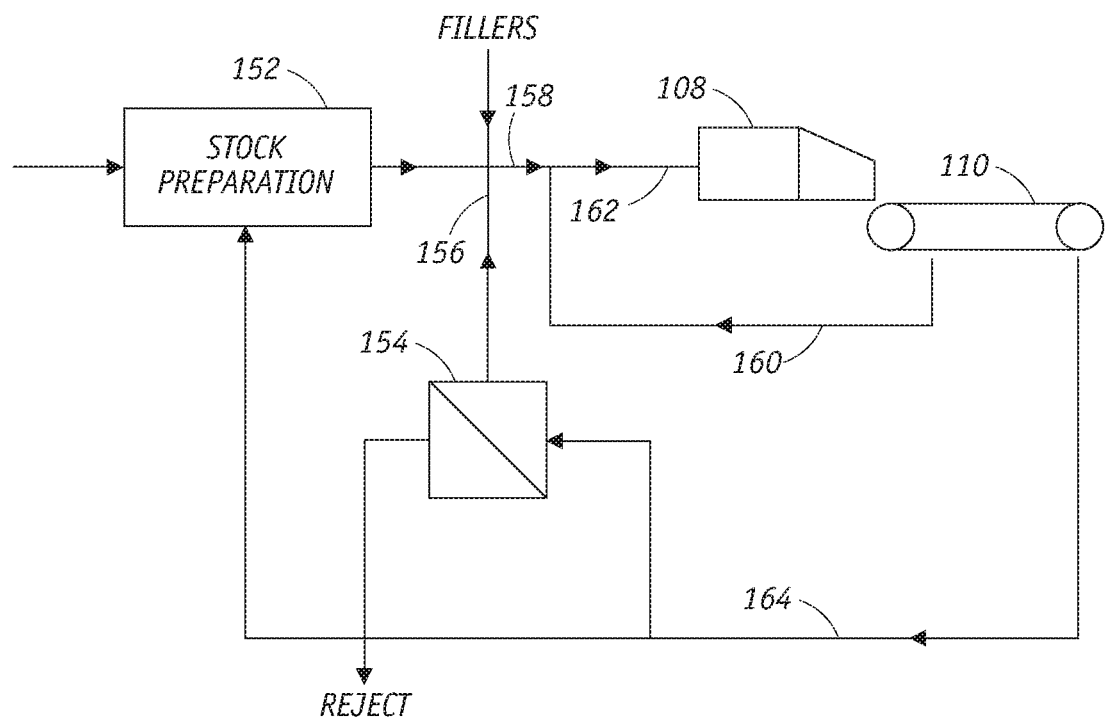
FIGS. 2A and 2B illustrate a paper production system.
Figure 2A:
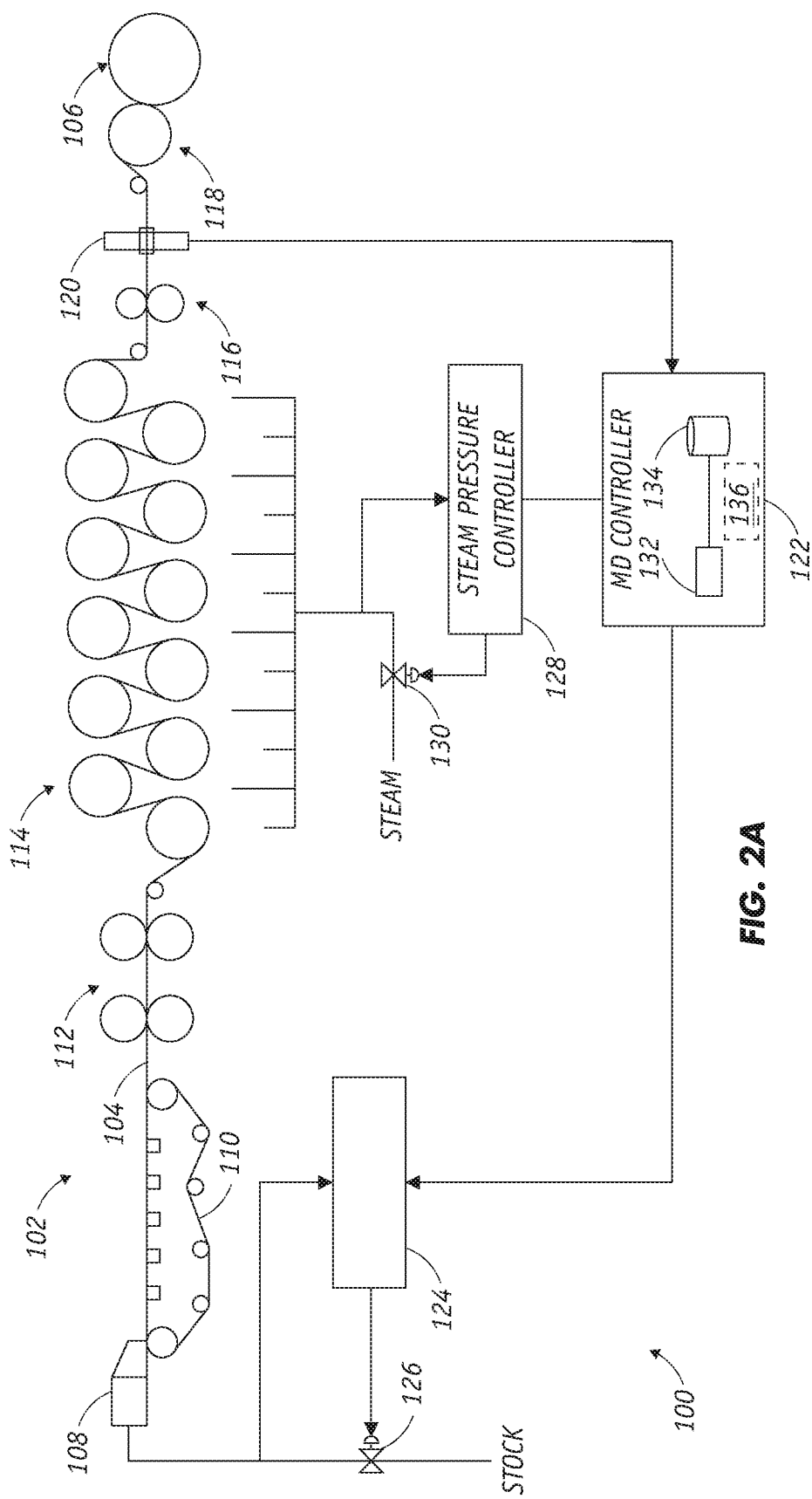

FIGS. 2A and 2B illustrate an example paper production system 100. As shown in FIG. 2A, the paper production system 100 includes a paper machine 102. The paper machine 102 includes various components used to produce or process a paper product. In this example, the various components may be used to produce a paper sheet 104 collected at a reel 106.

In this example embodiment, the paper machine 102 includes a headbox 108, which distributes a pulp suspension uniformly across the machine onto a continuous moving screen or mesh 110. The pulp suspension entering the headbox 108 may contain, for example, 0.2-3% wood fibers and possibly other solids, with the remainder of the suspension being water. The headbox 108 includes any suitable structure for distributing a pulp suspension. The headbox 108 may, for example, include a slice opening through which the pulp suspension is distributed onto the screen or mesh 110. The screen or mesh 110 represents any suitable structure for receiving a pulp suspension and allowing water or other materials to drain or leave the pulp suspension.

The sheet 104 then enters a press section 112, which includes multiple press rolls. The sheet 104 travels through the openings (referred to as "nips") between pairs of counter-rotating rolls in the press section 112. In this way, the rolls in the press section 112 compress the pulp material forming the sheet 104. This may help to remove more water from the pulp material and to equalize the characteristics of the sheet 104 on both sides of the sheet 104. The press section 112 may include any suitable number of press rolls in any suitable arrangement for pressing the sheet 104.

The sheet 104 next enters a dryer section 114, which includes a series of heated rolls. The sheet 104 travels over the heated rolls, which heats the sheet 104 and causes more water in the sheet 104 to evaporate. Steam or any other heated substances can be used to impart heat to the heated rolls in the dryer section 114. The dryer section 114 may include any suitable number of heated rolls in any suitable arrangement for heating the sheet 104 and removing water from the sheet 104.

A calendar 116 processes and finishes the sheet 104. For example, the calendar 116 may smooth the sheet 104 and impart a final finish, thickness, gloss, or other characteristic to the sheet 104. Other materials (such as starch or wax) can also be added to the sheet 104 to obtain the desired finish. The calendar 116 may include any suitable number of calendar stacks in any suitable arrangement for finishing the sheet 104. Once processing by the calendar 116 is complete, a reel device 118 collects the sheet 104 onto the reel 106.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the system 100. Other machines or devices could be used that include any other or additional components for producing a paper product. In addition, this disclosure is not limited to use with systems for producing or processing paper products and could be used with systems that produce or process other items or materials, such as plastic, textiles, metal foil or sheets, or other or additional materials.

In order to control the paper-making process, the properties of the sheet 104 may be continuously or repeatedly measured and the paper machine 102 adjusted to ensure sheet quality. This control may be achieved by measuring sheet properties using a scanner 120. The scanner 120 is capable of scanning the sheet 104 and measuring one or more characteristics of the sheet 104. For example, the scanner 120 could carry sensors for measuring the dry weight, moisture content, ash content, or any other or additional characteristics of the sheet 104. The scanner 120 includes any suitable structure or structures for measuring or detecting one or more characteristics of the sheet 104, such as a set or array of sensors. A scanning set of sensors represents one particular embodiment for measuring sheet properties. Other embodiments could include using a stationary set or array of sensors.

Measurements from the scanner 120 are provided to a machine direction (MD) controller 122. The controller 122 controls various operations of the paper machine 102 that affect machine direction characteristics of the sheet 104. A machine direction characteristic of the sheet 104 generally refers to an average characteristic of the sheet 104 that varies and is controlled in the machine direction (the direction of travel of the sheet 104). The machine direction is generally perpendicular to the cross direction (CD) of the sheet 104 (the direction across the sheet 104).

In this example, the controller 122 is capable of controlling the supply of pulp to the headbox 108. For example, the controller 122 could provide information to a stock flow controller 124, which controls a valve 126. The stock flow controller 124 generally controls the opening and closing of the valve 126 to control the flow of stock (a mixture of pulp, filler, water, and other materials) to the headbox 108. The stock flow controller 124 uses information from the MD controller 122 as well as measurements of the stock flow to the headbox 108 to control the valve 126.

The controller 122 is also capable of controlling the supply of steam to the dryer section 114. For example, the controller 122 could provide information to a steam pressure controller 128, which controls a valve 130. The steam pressure controller 128 generally controls the opening and closing of the valve 130 to control the steam pressure in the dryer section 114. In this way, the steam pressure controller 128 controls the heating of the rolls in the dryer section 114, thereby controlling the amount of drying provided by the dryer section 114. The steam pressure controller 128 uses information from the MD controller 122 as well as measurements of the steam pressure to control the valve 130.

The MD controller 122 includes any hardware, software, firmware, or combination thereof for controlling the operation of a paper or other machine. The MD controller 122 could, for example, include at least one processor 132 and at least one memory 134 storing instructions and data used, generated, or collected by the processor(s) 132.

The stock provided to the headbox 108 is produced as shown in FIG. 2B. Here, pulp is provided to a stock preparation unit 152. The stock preparation unit 152 processes the pulp to prepare the pulp for use in making the sheet 104 (FIG. 2A). For example, the stock preparation unit 152 could clean and refine the pulp fibers so that the pulp fibers have desired properties. The stock preparation unit 152 could also receive and process recycled fibers recovered from the screen or mesh 110. The stock preparation unit 152 includes any suitable structure(s) for preparing fibers or other materials for use in a paper machine.

The fibers provided by the stock preparation unit 152 are mixed with one or more fillers and with recycled materials provided by a retention unit 154. The resulting mixture represents a thick stock 158 and has a relatively high fiber consistency (such as around 4%). The thick stock 158 is then mixed with white water in a short circulation path 160 to produce a thin stock 162. The thin stock 162 has a relatively low fiber consistency (such as around 0.2%). The thin stock 162 is provided to the headbox 108 for use in forming the sheet 104. A long circulation path 164 provides recycled material to the retention unit 154 and the stock preparation unit 152 for recovery. The retention unit 154 may reject some of the material provided through the long circulation path 164.

In one aspect of operation, the MD controller 122 controls the stock flow, steam pressure, or other characteristics in the system 100. This allows the MD controller 122 to control various characteristics of the sheet 104. Also, the MD controller 122 can implement grade change control functionality, such as by incorporating or implementing a grade change controller 136 in the MD controller 122. The grade change controller 136 could also reside outside of and interact with the MD controller 122.

The grade change controller 136 implements grade changes in the system 100 more efficiently. For example, the grade change controller 136 may allow the paper machine 102 to transition from the production of one grade of sheet 104 to another grade of sheet 104 more rapidly. This may help to reduce or minimize the quantity of unmarketable product produced during the grade change. Additional details regarding this grade change control functionality are provided below.

Process Model

The physical process operations of a papermaking machine direction (MD) process can be represented by a mathematical model. The invention however does not depend on the particular model forms. The process model is supplied to the controller as a matrix of transfer functions in the Laplace domain (i.e. continuous time transfer functions). The controller converts the continuous time transfer functions to discrete time at the appropriate sampling interval. In this controller algorithm description, we will begin with the model as a transfer function in discrete time:

$$y(k+1) = G(z^{-1})u(k) \tag{1}$$

Where $y(k)$ is the $n_y$ dimensional output of the process model at the update point k, $u(k)$ is the $n_u$ dimensional input to the process model, and $G(z^{-1})$ is a matrix of discrete time transfer functions. $z^{-1}$ acts as the backshift operator, such that for a variable $\xi$:

$$\xi(k) = z^{-1}\xi(k+1)$$

Realization of Process Model in State Space Form

A simple state-space realization of the system (1) is:

$$\tilde{x}(k+1) = \tilde{A}\tilde{x}(k) + \tilde{B}u(k)$$

$$y(k+1) = \tilde{C}\tilde{x}(k+1) \tag{2}$$

where $\tilde{A}$ is an $n_x \times n_x$ constant matrix with $n_x$ dependent on the orders of the subsystems in the matrix $G(z^{-1})$; $\tilde{B}$ is an $n_x \times n_u$ constant matrix; and $\tilde{C}$ is an $n_y - n_x$ constant matrix.

We restructure this system as follows:

$$x(k+1) = \begin{bmatrix} \Delta\tilde{x}(k+1) \\ \tilde{C}\tilde{x}(k+1) \end{bmatrix} = \begin{bmatrix} \tilde{A} & 0 \\ \tilde{C}\tilde{A} & I \end{bmatrix}\begin{bmatrix} \Delta\tilde{x}(k) \\ \tilde{C}\tilde{x}(k) \end{bmatrix} + \begin{bmatrix} \tilde{B} \\ \tilde{C}\tilde{B} \end{bmatrix}\Delta u(k) \tag{3}$$

$$y(k+1) = [0 \quad I]x(k+1)$$

We then arrive at the scaled process model in augmented state-space form:

$$x(k+1) = Ax(k) + B\Delta u(k) \tag{4}$$
$$y(k+1) = Cx(k+1)$$

Where:

$$x(k) = \begin{bmatrix} \Delta\tilde{x}(k) \\ \tilde{C}\tilde{x}(k) \end{bmatrix} \tag{5}$$

$$A = \begin{bmatrix} \tilde{A} & 0 \\ \tilde{C}\tilde{A} & I \end{bmatrix} \tag{6}$$

$$B = \begin{bmatrix} \tilde{B} \\ \tilde{C}\tilde{B} \end{bmatrix} \tag{7}$$

$$C = [0 \quad I] \tag{8}$$

Note that the process model (4) relates the process input moves $\Delta u(k)$ at update point k to the process outputs $y(k+1)$ at update point k+1. The subsequent development of the MPC will be based on this model.

Cost Function

The MPC described herein follows a standard MPC receding horizon approach where, at each controller update, the next $H_u$ MV moves are calculated to minimize a cost function. $H_u$ is referred to as the control horizon. The first of the MV moves is implemented and then the optimal MV move sequence is re-calculated at the next controller update, taking into account the latest process information.

A typical cost function is given by (9):

$$J = \sum_{i=1}^{H_p} (y(k+i) - y_{ref}(k+i))^T \tilde{Q}_1 (y(k+i) - y_{ref}(k+i)) + \quad (9)$$

$$\sum_{i=1}^{H_u} (\Delta u(k+i-1))^T \tilde{Q}_2 \Delta u(k+i-1) \quad (10)$$

$H_p$ is the prediction horizon. $\tilde{Q}_1$ and $\tilde{Q}_2$ are constant matrices used to weight the relative costs of: the deviations the CVs from their target trajectories, $y_{ref}$; and the movement of the MVs.

In order to rewrite the cost function more compactly, we create the following matrices and vectors:

$$Y(k) = \begin{bmatrix} y(k+1) \\ y(k+2) \\ \vdots \\ y(k+H_p) \end{bmatrix} \quad (10)$$

$$Y_{ref}(k) = \begin{bmatrix} y_{ref}(k+1) \\ y_{ref}(k+2) \\ \vdots \\ y_{ref}(k+H_p) \end{bmatrix} \quad (11)$$

$$U_{Hu}(k) = \begin{bmatrix} u(k) \\ u(k+1) \\ \vdots \\ u(k+H_u-1) \end{bmatrix} \quad (12)$$

$$\Delta U(k) = U_{Hu}(k) - U_{Hu}(k-1) = \begin{bmatrix} \Delta u(k) \\ \Delta u(k+1) \\ \vdots \\ \Delta u(k+H_u-1) \end{bmatrix} \quad (13)$$

$$Q_1 = \begin{bmatrix} \tilde{Q}_1 & 0 & \cdots & 0 \\ 0 & \tilde{Q}_1 & \ddots & \vdots \\ \vdots & \ddots & \ddots & 0 \\ 0 & \cdots & 0 & \tilde{Q}_1 \end{bmatrix} \quad (14)$$

$$Q_2 = \begin{bmatrix} \tilde{Q}_2 & 0 & \cdots & 0 \\ 0 & \tilde{Q}_2 & \ddots & \vdots \\ \vdots & \ddots & \ddots & 0 \\ 0 & \cdots & 0 & \tilde{Q}_2 \end{bmatrix} \quad (15)$$

Then, we have:

$$J = (Y(k) - Y_{ref}(k))^T Q_1 (Y(k) - Y_{ref}(k)) + \Delta U(k)^T Q_2 \Delta U(k) \quad (16)$$

At this point it should be noted that Y(k) gives the predictions of the CV over the prediction horizon, based on the process model (4). The target trajectory over the prediction horizon, $Y_{ref}(k)$, can be designed in a number of different ways. For example, one very simple approach is to take the current setpoint, r(k), as the target for the entire prediction horizon. In this case, we have:

$$Y_{ref}(k) = \mathcal{J}_{H_p} r(k) \quad (17)$$

where $\mathcal{J}_{H_p}$ is a column matrix of $H_p$ $n_y \times n_y$ identity matrices:

$$\mathcal{J}_{H_p} = \begin{bmatrix} I \\ I \\ \vdots \\ I \end{bmatrix} \quad (18)$$

MPC will minimize the cost function (16) with respect to the input moves over the control horizon, i.e., with respect to $\Delta U(k)$. In order to accomplish this minimization, we will write Y(k) explicitly as a function of $\Delta U(k)$.

The predicted outputs Y(k) can be calculated by:

$$Y(k) = P_{cx} x(k) + P_{cu} \Delta U(k) \quad (19)$$

Where:

$$P_{cx} = \begin{bmatrix} CA \\ CA^2 \\ \vdots \\ CA^{H_p} \end{bmatrix} \text{ And} \quad (20)$$

$$P_{cu} = \begin{bmatrix} CB & 0 & \cdots & 0 \\ CAB & CB & \cdots & \vdots \\ \vdots & \vdots & \ddots & \vdots \\ CA^{H_p-1}B & CA^{H_p-2}B & \cdots & CA^{H_p-H_u}B \end{bmatrix} \quad (21)$$

We apply the identity (19) to the cost function (16):

$$J = (P_{cx}x(k) + P_{cu}\Delta U(k) - Y_{ref})^T Q_1 (P_{cx}x(k) + P_{cu}\Delta U(k) - Y_{ref}) + \Delta U(k)^T Q_2 \Delta U(k) \quad (22)$$

Control Variable and Manipulated Variable Trajectory Generation

U.S. Pat. No. 9,557,724 to Chu et al., which is incorporated herein by reference, describes an MPC technique to design the CV reference trajectories, $Y_{ref}(k)$, in a different manner than that shown in equation (17). Instead, the technique involved selection of a first-order plus deadtime process, and use of the first-order plus deadtime process as a filter to produce the future $H_p$ filtered values based on the current setpoint, r(k). An important aspect of this idea was that by including sufficient delay in the reference trajectory, the controller could find a set of reasonable MV moves that would result in the CVs following the reference trajectories with very little error.

For each CV, the user assigns an MV as the primary MV and chooses an alpha ratio for the CV. The primary MV is the MV which is expected or desired to have the greatest impact on the CV. If there is some uncertainty about which MV will have the greatest impact on a CV, then the MV-CV pairing with the longest time delay may be used to determine the primary MV. The target trajectory for the CV is then generated using the primary MV-CV model and the alpha ratio. Alpha ratio is a multiplier on the time constant of the primary MV-CV model, so that an alpha ratio greater than 1 implies a larger time constant and an alpha ratio less than 1 implies a smaller time constant. Taking the time constant of the primary MV-CV model multiplied by the alpha ratio, the time delay from the primary MV-CV model and a gain of one creates a delayed filter which will be used to generate the target trajectory over the prediction horizon. Creating such target trajectory causes the controller to take on behavior similar to that of the traditional Dahlin-based controller.

We apply a similar concept for grade change; however, instead of filtering the desired setpoint through a first-order plus deadtime process, the reference trajectory, $Y_{ref}(k)$, can be created by allowing for some delay, and then creating a simple ramp from the initial setpoint to the final setpoint at a pre-selected ramp rate. Other forms of reference trajectory may be chosen, such as delayed sigmoid functions. This provides a reference trajectory to the controller that provides a smooth and desirable path from the current CV target to the final CV target that can be achieved with reasonable control action. By including sufficient delay in the trajectory, the controller is better able to coordinate the MV movements.

The trajectory generation for grade change can be represented as:

$$Y_{ref}(k) = P_{yref}(z^{-1}) r(k) \quad (23)$$

Where $P_{yref}(z^{-1})$ is the $(n_y \times H_p) \times ny$ matrix of transfer functions that generates the reference trajectory.

Constraints

Minimization of the cost function (22) is subject to input minimum, maximum and move size constraints:

$$\min_{\Delta U(k)} J(\Delta U(k)) \quad (24)$$

subject to:

$$\left. \begin{array}{l} u(k) \geq \underline{u} \\ u(k) \leq \overline{u} \\ |\Delta u(k)| \leq \overline{\Delta u} \end{array} \right\} \forall k = 1 \ldots H_u$$

Where $\underline{u}$ is the input minimum, $\overline{u}$ is the input maximum and $\overline{\Delta u}$ is the maximum move size.

We introduce the identity:

$$U_{Hu}(k) = \mathcal{J}_{Hu} u(k-1) + \mathcal{L}_{Hu} \Delta U(k) \quad (25)$$

where $\mathcal{J}_{Hu}$ is a column matrix of $H_u$ $n_u$-$n_u$ identity matrices:

$$\mathcal{J}_{Hu} = \begin{bmatrix} I \\ I \\ \vdots \\ I \end{bmatrix} \quad (26)$$

And $\mathcal{L}_{Hu}$ is a $H_u \times H_u$ lower triangular block matrix of $n_u \times n_u$ identity matrices:

$$\mathcal{L}_{Hu} = \begin{bmatrix} I & 0 & \ldots & 0 \\ I & I & \ddots & \vdots \\ \vdots & \ddots & \ddots & 0 \\ I & \ldots & I & I \end{bmatrix} \quad (27)$$

The constraints in (24) written equivalently as:

$$U_{Hu}(k) \geq \mathcal{J}_{Hu} \underline{u}$$

$$U_{Hu}(k) \leq \mathcal{J}_{Hu} \overline{u}$$

$$\Delta U(k) \geq -\mathcal{J}_{Hu} \overline{\Delta u}$$

$$\Delta U(k) \leq \mathcal{J}_{Hu} \overline{\Delta u} \quad (28)$$

Can then be manipulated further to become:

$$\begin{bmatrix} -\mathcal{L}_{Hu} \\ \mathcal{L}_{Hu} \\ -I \\ I \end{bmatrix} \Delta U(k) \leq \begin{bmatrix} -\mathcal{J}_{Hu} \underline{u} + \mathcal{J}_{Hu} u(k-1) \\ \mathcal{J}_{Hu} \overline{u} - \mathcal{J}_{Hu} u(k-1) \\ \mathcal{J}_{Hu} \overline{\Delta u} \\ \mathcal{J}_{Hu} \overline{\Delta u} \end{bmatrix} \quad (29)$$

The problem (24) is then solved by quadratic programming to yield the optimal set of moves, $\Delta U^*(k)$.

In predictive control we implement only the first moves from $\Delta U^*(k)$; then wait one control interval and repeat the calculation. Therefore, we define the matrix $\mathcal{S}$:

$$\mathcal{S} = [I 0 \ldots 0] \quad (30)$$

The current control move made by the MDMV controller is then:

$$\Delta u(k) = \mathcal{S} \Delta U^*(k) \quad (31)$$

Forcing the Trajectory of a Process Input

Recall that the process input $u(k)$ is $n_u$ dimensional. Therefore, if the $n_u$ components of u are labeled $u_1, u_2, \ldots u_{n_u}$ then we can write:

$$\Delta U(k) = \begin{bmatrix} \Delta u_1(k) \\ \Delta u_2(k) \\ \vdots \\ \Delta u_{n_u}(k) \\ \Delta u_1(k+1) \\ \Delta u_2(k+1) \\ \vdots \\ \Delta u_{n_u}(k+1) \\ \vdots \\ \Delta u_1(k+H_u-1) \\ \Delta u_2(k+H_u-1) \\ \vdots \\ \Delta u_{n_u}(k+H_u-1) \end{bmatrix} = \quad (32)$$

$$R \begin{bmatrix} \Delta u_1(k) \\ \Delta u_1(k+1) \\ \vdots \\ \Delta u_1(k+H_u-1) \\ \Delta u_2(k) \\ \Delta u_2(k+1) \\ \vdots \\ \Delta u_2(k+H_u-1) \\ \vdots \\ \Delta u_{n_u}(k) \\ \Delta u_{n_u}(k+1) \\ \vdots \\ \Delta u_{n_u}(k+H_u-1) \end{bmatrix} = R \begin{bmatrix} \Delta U_1(k) \\ \Delta U_2(k) \\ \vdots \\ \Delta U_{n_u}(k) \end{bmatrix} = R \Delta \tilde{U}(k)$$

Here R is a simple matrix to re-order the components of $\Delta \tilde{U}$. The $\Delta \tilde{U}_i(k)$ are the individual movement trajectories of each component of the input u. In typical MPC control we would allow the controller to choose the values of all components in $\Delta \tilde{U}(k)$; however, it is sometimes desired to force one or more component trajectories (i.e. certain $\Delta \tilde{U}_i(k)$) to take pre-determined values, such as linear ramps.

For example in the case of paper machine MD control, it may be desirable to have the paper machine change speed by ramping the machine speed at a steady rate from some initial speed to some target speed. In this case, instead of allowing the controller to choose the values of the moves for the machine speed, the desired machine speed ramp is provided to the controller so that the controller can coordinate the movements of the other process inputs to minimize the disturbance to the process outputs.

In the case where the time delay from the change in the forced process input to the response of the process outputs is less than the time delay from changes in the other process inputs, a delayed machine speed ramp can be provided to the controller so that the controller may move the other process inputs in advance of the forced input so that the input moves may be fully coordinated.

Minimizing Cost

Typically, MPC proceeds by minimizing the cost function according to equation (24); however, when we wish to force one (or more) or the process inputs to follow a predetermined trajectory, the problem to be solved is modified to become:

$$\min_{\Delta U(k)} J(\Delta U(k)) \quad (33)$$

subject to:

$$\left. \begin{array}{l} u_j(k) \geq \underline{u}_j \\ u_j(k) \leq \bar{u}_j \\ |\Delta u_j(k)| \leq \overline{\Delta u_j} \end{array} \right\} \forall\, j \neq i, k = 1 \ldots H_u$$

$$\Delta \breve{U}_i(k) = \Delta \breve{U}_i^*(k)$$

where $\Delta \tilde{U}^*_i(k)$ is the predetermined trajectory that the $i^{th}$ process input will be forced to follow.

This is a quadratic program (QP) with equality constraints. There are many solvers available for this problem. In this invention, the problem is solved by direct substitution. The desired trajectory is substituted into the objective function (22); $\Delta \tilde{U}_i(k)$ is then removed from the decision variables, which means that $\Delta U(k)$ is modified to exclude $\Delta \tilde{U}_i(k)$. This reduces the size of the QP and eliminates the possibility of any inefficient behavior or poor handling of equality constraints in commercial QP solvers.

Application to Grade Change

The above described concepts are particularly suited to implement grade changes for paper machine control, and also to facilitate grade or composition change control for general flat sheet or web and other industrial processes. For example, the MPC-based forced ramping is applicable to the continuous manufacturer of packaging, rubber sheets, plastic film, metal foil, and the like. These processes use actuators that are aligned along the machine direction and which engage and shape the continuously moving sheet or web of material.

In the manufacture of rubber and plastic materials, grade or composition changes include changes to polymer composition and additives as the rubber or plastic undergoes various operating including calendaring and molding steps after exiting an extrusion machine. For metal foil, grade or composition changes occur, for example, when alloys are reformulated with different percentages of individual metals. The alloy composition undergoes a series of operations including extrusion and annealing to fabricate alloys with different compositions and thicknesses.

With present invention, the trajectory generation for grade changes as represented in equation (23) is employed to design desirable CV reference trajectories for the MPC. The MPC is able to find MV moves that cause the CVs to follow the reference trajectories without significant deviation. In addition some MVs can be forced to follow linear ramps, as described in the Forcing the Trajectory of a Process Input section. For both the CV reference trajectory design and the forced ramp design, the trajectories include sufficient delays so that the MPC may fully coordinate MV movements to achieve minimal deviations of the CVs from their targets. The result is a model predictive controller that can pilot an industrial process smoothly from one operating region (one set of operating points) to a new operating region.

Figure 3:
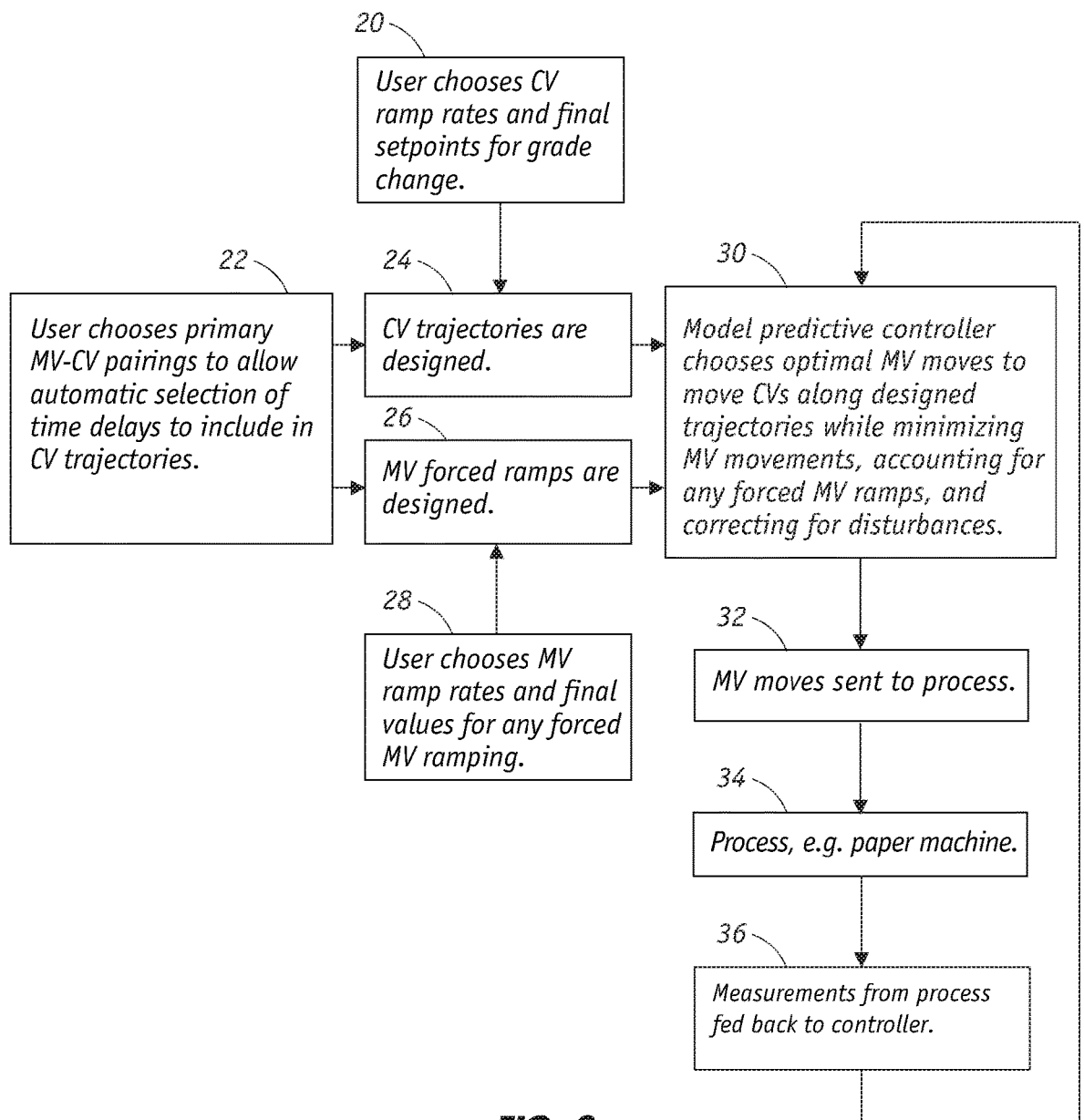
FIG. 3 is a block diagram illustrating the application of MPC-based forced ramping to a papermaking machine.

FIG. 3 illustrates general preferred steps in a strategy to implement MPC-based forced ramping for papermaking. The operator selects (i) CV ramp rates and final setpoints for a particular grade change (20), (ii) MV ramp rates and final values for any forced MV ramping (24), and (iii) primary MV-CV pairings to permit automatic selection of time delays to include CV trajectories (22). The CV trajectories (26) and MV forced ramps (28), which are designed based on the operator's selections, are inputs into the MPC (30). The controller is configured to choose optimal MV moves to move CVs along designed trajectories while minimizing MV movements thereby accounting for any forced MV ramps and correcting for disturbances. During a grade change, MV moves are sent to the process (32) and measurements from the papermaking machine (34) are fed back to the controller (36).

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of model predictive control of a sheet making system, which includes a processing unit, (i) a plurality of actuators that are positioned along a machine direction relative to a moving sheet of material and (ii) sensors for measuring and acquiring property data of the moving sheet of material, that comprises:

assigning a target for one or more manipulated variables (MVs) that control the plurality of actuators;

selecting delays and ramps for the one or more MVs for which targets have been assigned;

assigning a target for one or more controlled variable (CVs);

selecting delayed linear ramp or filtered ramp rates for the one or more CVs;

calculating trajectories for the one or more MVs for which targets have been assigned based on the target and the selected delays and ramps;

calculating trajectories for at least one controlled variable based on the target and on the selected delayed linear ramps or filtered ramp rates;

calculating moves for any MVs that do not have pre-assigned targets by minimizing a cost function that penalizes deviations of the CVs from the calculated trajectories and also penalizes MV movements;

determining a grade change by generating a reference trajectory by allowing a time delay and the creation of a ramp from an initial setpoint to a final setpoint at a pre-selected ramp rate, wherein the generated reference trajectory is represented as:

$$Y\,ref(k)=P\,yref(z^{-1})r(k),$$

where the Pyref($z^1$) is a (nyxH,)xny matrix of transfer functions that generates the reference trajectory and r(k) is current setpoint;

implementing the grade change using the reference trajectories and the calculated MV moves that minimize the cost function so as to transition from the production of the product having a first grade to the production of a product having a second grade.

2. The method of claim 1 wherein the sheet making system comprises a papermaking system.

3. The method of claim 2 wherein CVs comprise one or more of: a dry weight of the paper sheet, moisture content of the paper sheet, and ash content of the paper sheet and MVs comprise one or more of: wet stock flow, a filler flow, a steam pressure associated with a dryer section in the paper machine, and a machine speed associated with the paper machine.

4. The method of claim 1 wherein a target for one or more of the CVs comprises a recipe for the second grade.

5. The method of claim 1 wherein use of a process input forced ramping allows linear ramping of one or more process inputs with optimal coordination of other process input movements to keep all process outputs following the desired trajectory.

6. The method of claim 1 wherein the processing unit is configured to automatically determine appropriate process output reference trajectory delays to enable optimum coordination of process input movements.

7. The method of claim 1 wherein an entire planning process output reference trajectory ramp is provided at the start of a grade change.

8. The method of claim 7 wherein movement of process inputs drive process outputs along a planned future path and not just towards a current target.

9. The method of claim 7 wherein an output reference trajectory ramp is not provided incrementally as the grade change progresses.

10. A system of controlling the production of a sheet of material in a sheet making machine, which is moving in the machine direction (MD), which system comprises:

a plurality of actuators that is positioned along the MD wherein each of the plurality of actuators is controllable to vary a property of the material;

sensors for measuring and acquiring property data of the sheet of material;

a model predictive controller (MPC) for initiating and monitoring a transition from the production of a first grade of sheet of material to a second grade of sheet of material within a preselected time period, wherein the MPC, in response to signals that are indicative of the properties of the material, provide signals to the plurality of actuators to vary properties of the material, wherein the transition is characterized by time delays and forced ramps; and a controller that comprises:
a processing unit;
an input for providing one or more controlled variables (CV) to the processing unit from the sheet making machine; and
an output for providing one or more manipulated variables (MV) from the processing unit to the sheet making machine, wherein one or more of the MVs has a pre-specified trajectory; wherein the processing unit is configured to (i) sample one or more of the CVs and to calculate MV movements to minimize a cost function that penalizes deviations of the CVs from their designed trajectories and also penalizes MV movements using the MPC over a time horizon, wherein the MPC uses a quadratic programming (QP) algorithm and for each CV, a primary MV is assigned and a ramp rate is selected for the CV wherein the trajectory for the CV is generated using a primary MV-CV model and the ramp rate; which is a delayed ramp or a filtered ramp, and (ii) implement a move of the one or more MVs and outputting one or more of the MVs to the sheet making machine,
wherein the processing unit is further configured to:
determine a grade change by generating a reference trajectory by allowing a time delay and the creation of a ramp from an initial setpoint to a final setpoint at a pre-selected ramp rate, wherein the generated reference trajectory is represented as:

$$Y\_ref(k)=P\_yref(z^{-1})r(k),$$

where the Pyref($z^1$) is a (nyxH,)xny matrix of transfer functions that generates the reference trajectory and r(k) is current setpoint;

implement the grade-change using the reference trajectories and the calculated MV moves that minimize the cost function so as to transition from the production of the product having a first grade to the production of a product having a second grade.

11. The system of claim 10 wherein the MPC is configured to automatically determine appropriate process output reference trajectory delays to enable optimum coordination of process input movements.

12. The system of claim 10 wherein aqueous fibrous wet stock that is formed on a moving water permeable wire of a de-watering machine that comprises a headbox having a plurality of apertures through which wet stock discharged.

13. The system of claim 10 wherein the actuators engage and shape a continuous sheet of moving material.

14. The system of claim 10 wherein the sheet material comprises a continuous sheet of material that is selected from the group consisting of paper, metal, rubber, plastic and packaging.

15. The system of claim 10 wherein use of a process input forced ramping allows linear ramping of one or more process inputs with optimal coordination of other process input movements to keep all process outputs following the desired trajectory.

16. The system of claim 10 wherein an entire planning process output reference trajectory ramp is provided at the start of a grade change.

17. The system of claim 16 wherein movement of process inputs drive process outputs along a planned future path and not just towards a current target.

18. The system of claim 16 wherein an output reference trajectory ramp is not provided incrementally as a grade change progresses.

* * * * *